(12) United States Patent
He et al.

(10) Patent No.: US 11,274,542 B2
(45) Date of Patent: Mar. 15, 2022

(54) SELF-ADJUSTING DAMPING VIBRATION ABSORBER FOR WHILE-DRILLING INSTRUMENTS AND ADJUSTING METHOD THEREOF

(71) Applicant: Institute of Geology and Geophysics, Chinese Academy of Sciences, Beijing (CN)

(72) Inventors: Xinzhen He, Beijing (CN); Qingyun Di, Beijing (CN); Jiansheng Du, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/338,427

(22) Filed: Jun. 3, 2021

(65) Prior Publication Data

US 2021/0301646 A1    Sep. 30, 2021

Related U.S. Application Data

(63) Continuation of application No. PCT/CN2021/082865, filed on Mar. 25, 2021.

(30) Foreign Application Priority Data

Mar. 30, 2020 (CN) .......................... 202010239224.3

(51) Int. Cl.
*E21B 47/01* (2012.01)
*E21B 47/017* (2012.01)
(Continued)

(52) U.S. Cl.
CPC ............ *E21B 47/017* (2020.05); *E21B 47/07* (2020.05); *F16F 15/002* (2013.01);
(Continued)

(58) Field of Classification Search
CPC ...... E21B 47/017; E21B 47/07; F16F 15/002; F16F 2224/02; F16F 2224/0283; F16F 2228/001; F16F 2230/18
See application file for complete search history.

(56) References Cited

U.S. PATENT DOCUMENTS 3,323,326 A  *  6/1967  Vertson  ................... E21B 17/07
                                                                464/20
4,223,746 A  *  9/1980  Tanguy  ................. E21B 47/017
                                                                175/40
(Continued)

FOREIGN PATENT DOCUMENTS

CN         1266447 A       9/2000
CN         1788895 A       6/2006
(Continued)

*Primary Examiner* — Xuan Lan Nguyen
(74) *Attorney, Agent, or Firm* — Muncy, Geissler, Olds & Lowe, P C.

(57) ABSTRACT

The present application relates to self-adjusting damping vibration absorbers, in particular to a self-adjusting damping vibration absorber for while-drilling instruments and an adjusting method thereof. The self-adjusting damping vibration absorber includes a vibration monitor and controller tool and a vibration absorber body. The vibration monitor and controller tool is mounted inside the downhole while-drilling instrument, one end of the vibration absorber body is connected to the vibration monitor and controller tool through an insulating connector, the joint is provided with an insulating pad, the other end is connected to a sensor or circuit board tool that needs vibration damping, and the inside of the vibration absorber body is provided with a damping adjustment layer made of an electroactive polymer. By controlling the magnitude of an applied voltage, the damping adjustment can be realized, and the damping adjustment layer has the characteristics of high response speed and high control precision. The self-adjusting damp-
(Continued)

ing vibration absorber of the present application can adjust the vibration absorber damping according to the changes of the downhole vibration and temperature, so that the vibration absorber inherent frequency avoids or is far away from the vibration frequency of the downhole while-drilling instrument so as to avoid resonance, and thereby, the vibration absorber achieves the best vibration damping effect.

9 Claims, 4 Drawing Sheets

(51) Int. Cl.
    *E21B 47/07*     (2012.01)
    *F16F 15/00*     (2006.01)

(52) U.S. Cl.
    CPC ... *F16F 2224/02* (2013.01); *F16F 2224/0283* (2013.01); *F16F 2228/001* (2013.01); *F16F 2230/18* (2013.01)

(56) References Cited

U.S. PATENT DOCUMENTS

| | | | | |
|---|---|---|---|---|
| 7,044,219 | B2 * | 5/2006 | Mason | E21B 47/017 |
| | | | | 166/242.1 |
| 7,748,474 | B2 * | 7/2010 | Watkins | E21B 28/00 |
| | | | | 175/56 |
| 8,977,523 | B2 * | 3/2015 | Ertas | E21B 44/00 |
| | | | | 703/2 |
| 2018/0179830 | A1 * | 6/2018 | Konschuh | E21B 17/07 |
| 2019/0024499 | A1 | 1/2019 | Difoggio | |

FOREIGN PATENT DOCUMENTS

| | | |
|---|---|---|
| CN | 205207515 U | 5/2016 |
| CN | 206458458 U | 9/2017 |

* cited by examiner

SELF-ADJUSTING DAMPING VIBRATION ABSORBER FOR WHILE-DRILLING INSTRUMENTS AND ADJUSTING METHOD THEREOF

FIELD

The present application relates to damping vibration absorbers, in particular to a self-adjusting damping vibration absorber for while-drilling instruments and an adjusting method thereof.

BACKGROUND

At present, while-drilling instruments are used for downhole work. The working environment is very harm, gathering high temperature, high pressure, strong vibration and strong impact, so high-precision sensors and complex precision circuit boards working in this environment need vibration absorbers to damp vibrations, so as to improve the service life of the sensors and circuit boards and reduce the failure rate of downhole work. In the prior art, the vibration absorber is made of ordinary rubber. Once the design of the ordinary rubber vibration absorber is completed, the rubber stiffness and damping are fixed, so the vibration absorber inherent frequency is also fixed. When the downhole vibration frequency is close to the vibration absorber inherent frequency, resonance is prone to occur, and the vibration absorber cannot achieve a good vibration damping effect. The downhole vibrations are extremely complex and have uncertain frequency, and the vibration absorber cannot adapt to every working condition. When the downhole temperature rises, the rubber stiffness and damping of the vibration absorber will change, and the vibration absorber will easily fail and cannot achieve a good vibration damping effect.

SUMMARY

The present application discloses a self-adjusting damping vibration absorber for while-drilling instruments to solve any of the above-mentioned and other potential problems in the prior art.

In order to achieve the above objective, the technical solution of the present application is: a self-adjusting damping vibration absorber for while-drilling instruments, wherein the self-adjusting damping vibration absorber includes a vibration monitor and controller tool and a vibration absorber body;

the vibration monitor and controller tool is configured to monitor a vibration frequency of a downhole while-drilling instrument under different working conditions, analyze the vibration frequency and control the vibration absorber body; and the vibration absorber body is configured to absorb vibration energy and accelerate vibration attenuation, and is capable of changing a vibration damping coefficient according to an instruction from the vibration monitor and controller tool so as to change the inherent frequency and avoid resonance;

wherein the vibration monitor and controller tool is mounted inside the downhole while-drilling instrument, one end of the vibration absorber body is connected to the vibration monitor and controller tool through an insulating connector, and the other end is connected to a tool that needs vibration damping.

Further, the vibration absorber body includes a vibration absorber shell, a vibration absorber core, a damping adjustment layer and a scotch;

one end of the vibration absorber shell is connected to the sensor or circuit board tool that needs vibration damping, the inside of the other end is provided with a damping adjustment cavity, the inside of the damping adjustment cavity is provided with a limit boss, and a side wall close to an end of the damping adjustment cavity is provided with a limit ring groove;

an outer side wall of the vibration absorber core is coated with the damping adjustment layer, one end of the vibration absorber core is inserted into the inside of the damping adjustment cavity, the vibration absorber core inserted into the damping adjustment cavity is provided thereon with a scotch fixing via and a double boss matched with the limit boss, the scotch is inserted into the scotch fixing via, two ends are respectively inserted into the limit ring groove, and the scotch is capable of rotating along the limit ring groove; and the other end of vibration absorber core is connected to the vibration monitor and controller tool.

Further, the vibration absorber shell includes a first vibration absorber half shell and a second vibration absorber half shell;

wherein cross sections of the first vibration absorber half shell and the second vibration absorber half shell are semi-circular, end surfaces are respectively provided thereon with a boss and a groove, and the boss and the groove are matched with each other to realize mutual limit of the first vibration absorber half shell and the second vibration absorber half shell.

Further, a thickness of the damping adjustment layer is 2-5 mm.

Further, a material of the damping adjustment layer is an electroactive polymer.

Further, a material of the insulating pad and the insulating connector is a high-strength PEEK (polyetheretherketone) material.

Further, the vibration monitor and controller tool includes a structure body, a power module, an X axis vibration accelerometer, a Y axis vibration accelerometer, a Z axis vibration accelerometer, a temperature sensor and a controller;

wherein the X axis vibration accelerometer, the Y axis vibration accelerometer, the Z axis vibration accelerometer, the power module, the temperature sensor and the controller are all arranged on the structure body; and the X axis vibration accelerometer, the Y axis vibration accelerometer, the Z axis vibration accelerometer, the power module and the temperature sensor are all connected to the controller, and one end of the structure body is fixedly connected to one end of the vibration absorber core.

A while-drilling instrument is provided. The above self-adjusting damping vibration absorber is mounted in the while-drilling instrument to realize automatic adjustment of damping.

Another objective of the present application is to provide an adjusting method using the above self-adjusting damping vibration absorber. The method specifically includes the following steps:

S1) acquiring a vibration frequency of a downhole while-drilling instrument at different temperatures in real time according to a limit time as a current downhole environment vibration frequency x;

S2) comparing the acquired vibration frequency x of the downhole while-drilling instrument at different temperatures with a vibration absorber inherent vibration frequency y adjusted last time; and S3) determining whether the vibration absorber inherent vibration frequency y needs to be adjusted to avoid resonance (that is, x≠y) according to the comparison result.

Further, the criteria for the comparison in S2) are:

if y≤0.6x or y≥1.4x, the vibration absorber inherent vibration frequency y does not need to be adjusted;

if 0.6x<y<x, the vibration absorber inherent vibration frequency is adjusted to y=1.4x;

and if x<y<1.4x, the vibration absorber inherent vibration frequency is adjusted to y=0.6x.

Further, the current downhole environment vibration frequency in S1) is: a vibration frequency with a fluctuation rate≤10% intercepted among the vibration frequencies of the used downhole while-drilling instrument.

The present application has the following beneficial effects: due to the adoption of the above technical solution, the self-adjusting damping vibration absorber of the present application is capable of adjusting the vibration absorber damping according to the changes of the downhole vibration and temperature, so that the vibration absorber inherent frequency avoids or is far away from the downhole environment vibration frequency so as to avoid resonance, and thereby, the vibration absorber achieves the best vibration damping effect.

1. vibration monitor and controller tool, 2. vibration absorber body, 3. vibration absorber core, 3.1. scotch fixing via, 3.2. double boss, 4. damping adjustment layer, 5. insulating pad, 6. insulating connector, 7. X axis vibration accelerometer, 8. power module, 9. structure body, 10. controller, 11. scotch, 12. Z axis vibration accelerometer, 13. Y axis vibration accelerometer, 14. temperature sensor, 15. damping adjustment cavity, 15.1. limit boss, 15.2. limit ring groove, 16. vibration absorber shell, 16.1. first vibration absorber half shell, 16.2. second vibration absorber half shell, 16.3 boss, 16.4. groove, 17. sensor or circuit board tool that needs vibration damping.

DETAILED DESCRIPTION OF THE EMBODIMENTS

The technical solution of the present application will be further described below with reference to the accompanying drawings.

Figure 1:
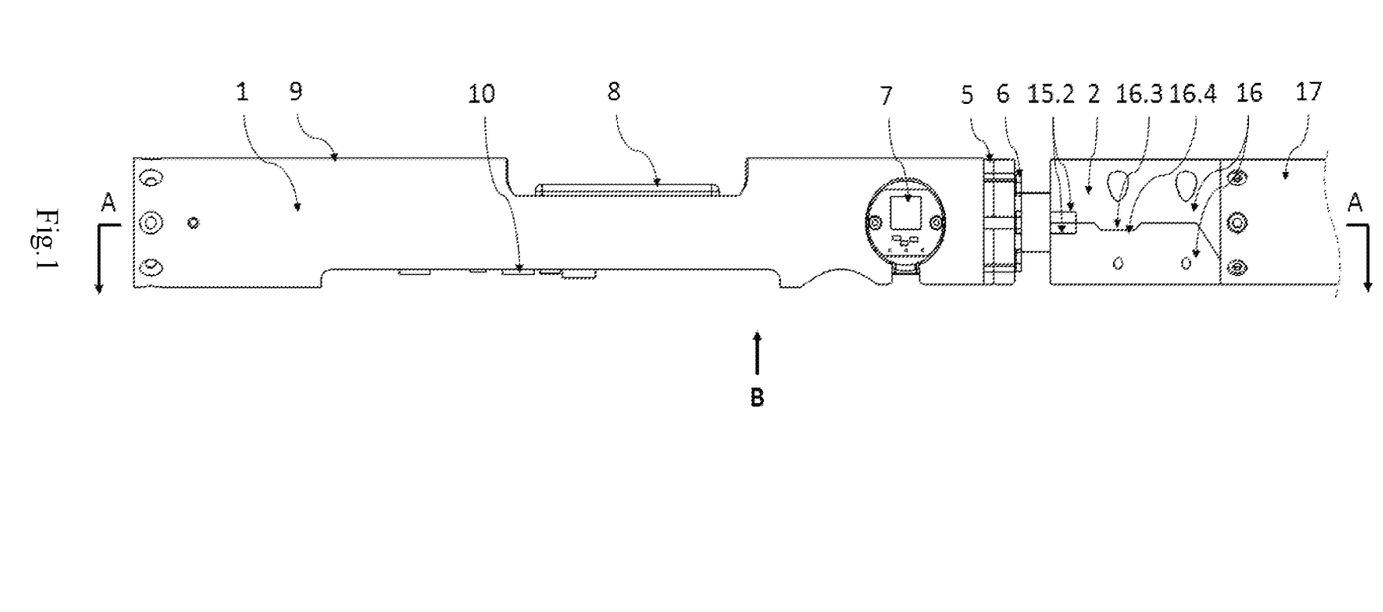
FIG. 1 is a schematic structural diagram of a self-adjusting damping vibration absorber for while-drilling instruments according to the present application.
Figure 2:
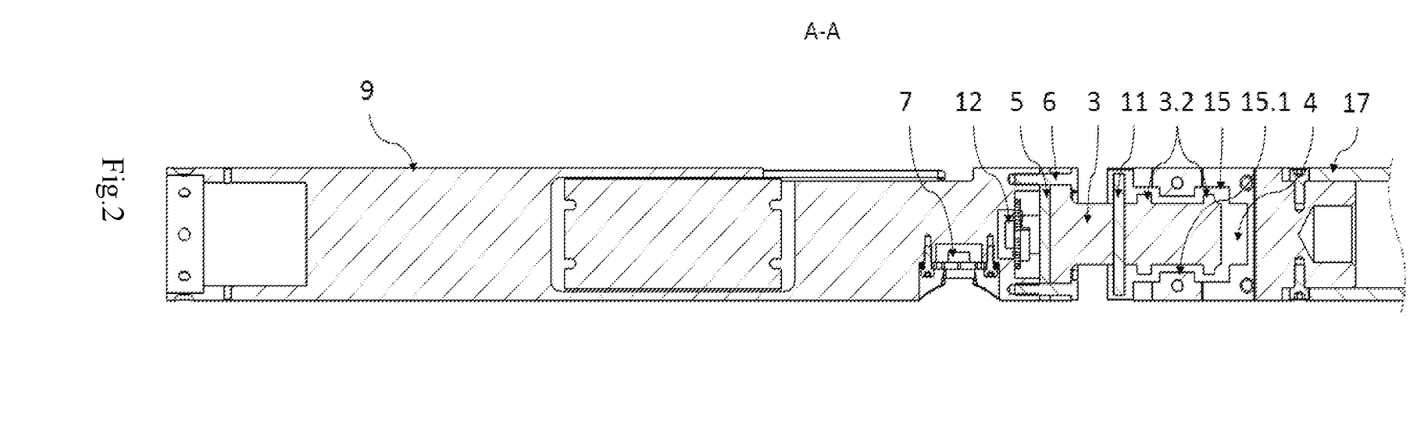
FIG. 2 is a schematic sectional structural diagram of the self-adjusting damping vibration absorber for while-drilling instruments along direction A according to the present application.

As shown in FIG. 1-FIG. 2, the present application provides a self-adjusting damping vibration absorber for while-drilling instruments, wherein the self-adjusting damping vibration absorber includes a vibration monitor and controller tool 1 and a vibration absorber body 2;

the vibration monitor and controller tool 1 is configured to monitor a vibration frequency of a downhole while-drilling instrument under different working conditions, analyze the vibration frequency and control the vibration absorber body 2; and the vibration absorber body 2 is configured to absorb vibration energy and accelerate vibration attenuation, and is capable of changing a vibration damping coefficient according to an instruction from the vibration monitor and controller tool 1 so as to change the inherent frequency and avoid resonance;

wherein the vibration monitor and controller tool 1 is mounted inside the downhole while-drilling instrument, one end of the vibration absorber body 2 is connected to the vibration monitor and controller tool 1 through an insulating connector 6, and the other end is connected to a tool that needs vibration damping 17.

The vibration absorber body 2 includes a vibration absorber shell 16, a vibration absorber core 3, a damping adjustment layer 4 and a scotch 11;

one end of the vibration absorber shell 16 is connected to the sensor or circuit board tool that needs vibration damping 17, the inside of the other end is provided with a damping adjustment cavity 15, the inside of the damping adjustment cavity 15 is provided with a limit boss 15.1, and a side wall close to an end of the damping adjustment cavity 15 is provided with a limit ring groove 15.2;

an outer side wall of the vibration absorber core 3 is uniformly coated with the damping adjustment layer 4, one end of the vibration absorber core 3 is inserted into the inside of the damping adjustment cavity 15, the vibration absorber core 3 inserted into the damping adjustment cavity is provided thereon with a scotch fixing via 3.1 and a double boss 3.2 matched with the limit boss 15.1, the scotch 11 is inserted into the scotch fixing via 3.1, two ends are respectively inserted into the limit ring groove 15.2, and the scotch 11 is capable of rotating along the limit ring groove 15.2; and the other end of vibration absorber core 3 is connected to the vibration monitor and controller tool 1.

The vibration absorber shell 16 is composed of a first vibration absorber half shell 16.1 and a second vibration absorber half shell 16.2;

wherein cross sections of the first vibration absorber half shell 16.1 and the second vibration absorber half shell 16.2 are semicircular, end surfaces of the first vibration absorber half shell 16.1 and the second vibration absorber half shell 16.2 are respectively provided thereon with a boss 16.3 and a groove 16.4, and the boss 16.3 and the groove 16.4 are matched with each other to realize mutual limit of the first vibration absorber half shell 16.1 and the second vibration absorber half shell 16.2.

A thickness of the damping adjustment layer 4 is 2-5 mm.

A material of the damping adjustment layer 4 is an electroactive polymer.

A material of the insulating pad 5 and the insulating connector 6 is a high-strength PEEK material.

Figure 3:
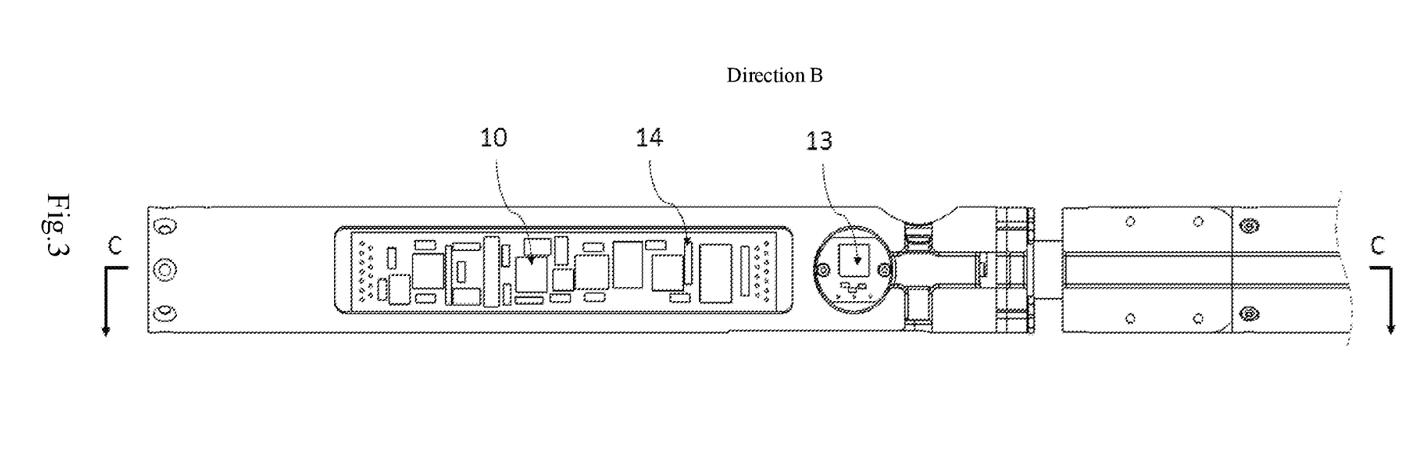
FIG. 3 is a schematic sectional structural diagram of the self-adjusting damping vibration absorber for while-drilling instruments along direction B according to the present application.
Figure 4:
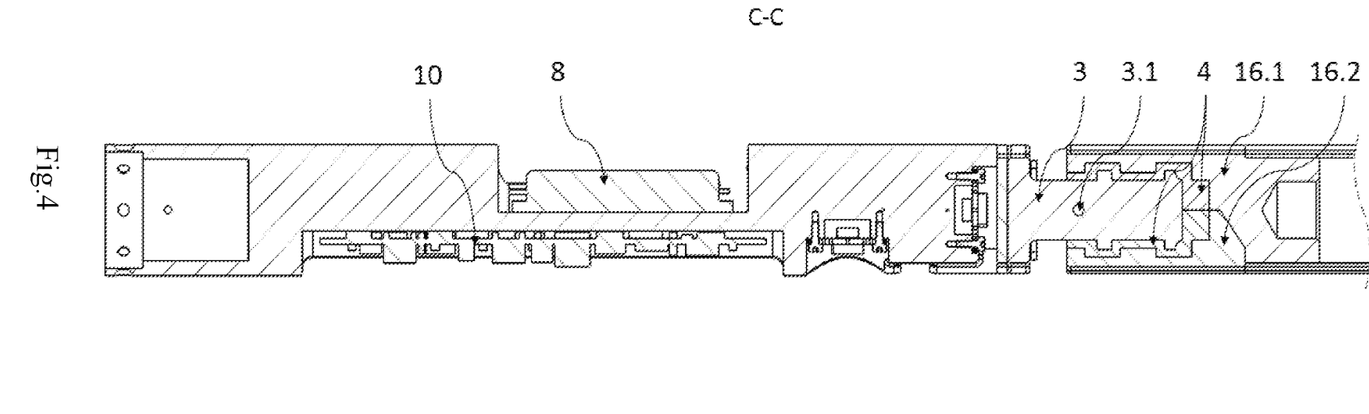
FIG. 4 is a schematic sectional structural diagram of the self-adjusting damping vibration absorber for while-drilling instruments along direction C according to the present application.

The vibration monitor and controller tool 1 includes a structure body 9, a power module 8, an X axis vibration accelerometer 7, a Y axis vibration accelerometer 13, a Z axis vibration accelerometer 12, a temperature sensor 14 and a controller 10;

wherein the X axis vibration accelerometer 7, the Y axis vibration accelerometer 13, the Z axis vibration accelerometer 12, the power module 8, the controller 10 and the temperature sensor 14 are all arranged on the structure body 9, the X axis vibration accelerometer 7, the Y axis vibration accelerometer 12, the Z axis vibration accelerometer 13, the power module 8 and the temperature sensor 14 are all connected to the controller 10, and one end of the structure body 9 is fixedly connected to one end of the vibration absorber core 3, as shown in FIG. 3-FIG. 4.

An adjusting method using the above self-adjusting damping vibration absorber is provided. The method specifically includes the following steps:

S1) acquiring a vibration frequency of a downhole while-drilling instrument at different temperatures in real time according to a limit time as a current downhole environment vibration frequency x;

S2) comparing the acquired vibration frequency x of the downhole while-drilling instrument at different temperatures with a vibration absorber inherent vibration frequency y adjusted last time; and S3) determining whether the vibration absorber inherent vibration frequency y needs to be adjusted to avoid resonance according to the comparison result.

The criteria for the comparison in S2) are:

if y≤0.6x or y≥1.4x, the vibration absorber inherent vibration frequency y does not need to be adjusted;

if 0.6x<y<x, the vibration absorber inherent vibration frequency is adjusted to y=1.4x; and if x<y<1.4x, the vibration absorber inherent vibration frequency is adjusted to y=0.6x.

The current downhole environment vibration frequency x in S1) is: a vibration frequency with a fluctuation rate≤10% intercepted among the vibration frequencies of the used downhole while-drilling instrument.

Embodiment

As shown in FIG. 1-FIG. 2, a self-adjusting damping vibration absorber for while-drilling instruments is provided. A vibration absorber shell 16 includes a first vibration absorber half shell 16.1 and a second vibration absorber half shell 16.2, and a boss 16.3 and a groove 16.4 are matched with each other to realize limit and used for placing a damping adjustment layer 4. The damping adjustment layer 4 is divided into two pieces of the same size, which are wrapped and mounted on a vibration absorber core 3. An outer circle of the damping adjustment layer 4 is embedded and mounted in a damping adjustment cavity 15 inside a vibration absorber half shell 16.1 and a vibration absorber half shell 16.2. The damping adjustment layer 4 has a uniform radial thickness, and can cooperate with the vibration absorber core 3 to effectively damp the radial vibration.

The vibration absorber core 3 is provided with a scotch fixing via 3.1, a scotch 11 passes through the scotch fixing via 3.1, two ends are respectively inserted into the limit ring groove 15.2, the scotch 11 is capable of rotating along the limit ring groove 15.2 to prevent the vibration absorber core 3 from rotating relative to the vibration absorber half shells, the scotch 11 is also wrapped by the two pieces of damping adjustment layer 4, and the scotch 11 and the damping adjustment layer 4 are matched to well damp the circumferential vibration.

The vibration absorber core 3 is provided with a double boss 3.2, and the double boss 3.2, the limit boss 15.1 and the damping adjustment layer 4 are matched to well damp the axial vibration.

The damping adjustment layer 4 is made of an electroactive polymer, the electroactive polymer is also a dielectric elastomer which is an intelligent material and has special electrical properties, and positive and negative poles of one output of the power module 8 are respectively connected to the vibration absorber core 3 and the vibration absorber shell 16. When the applied voltage changes, the electroactive polymer damping adjustment layer in the damping adjustment cavity 15 is deformed after being electrically stimulated, which changes the damping of the vibration absorber body 1, thereby changing the vibration absorber inherent frequency. The damping adjustment layer has the characteristics of high response speed and high control precision.

One end of the vibration absorber body 2 is connected to a sensor or circuit board tool 17 that needs vibration damping.

The other end of the vibration absorber body 2 is connected to the vibration monitor and controller tool 1 with an insulating pad 5 in the middle, and the insulating pad 5 fastened with the vibration monitor and controller tool 1 through six insulating connectors 6. The insulating pad 5 and the insulating connectors 6 function to insulate the mounting structure body 9 from the vibration absorber core 3. The insulating pad 5 and the insulating connectors 6 are made of a high-strength PEEK material. This material has good insulating properties and high strength, and its properties are not susceptible to temperature.

The vibration monitor and controller tool 1 includes a structure body 9, a power module 8, an X axis vibration accelerometer 7, a Y axis vibration accelerometer 13, a Z axis vibration accelerometer 12, a controller 10 and a temperature sensor 14.

Circuit boards of the X axis vibration accelerometer 7, the Y axis vibration accelerometer 13, the Z axis vibration accelerometer 12 are fixed to the mounting structure body 9 with screws. The triaxial accelerometer is configured to detect downhole environment vibrations, and the direction of the sensitive axis is the direction perpendicular to the accelerometer chip.

The temperature sensor 14 is configured to monitor a downhole environment temperature.

The controller 10 is configured to acquire monitoring data on the triaxial accelerometer and monitoring data on the temperature sensor 14.

The self-adjusting damping vibration absorber is subjected to a ground vibration experiment. At different environment temperatures, the magnitude of the applied voltage between the vibration absorber core 3 and the vibration absorber half shells and the inherent frequency when the vibration absorber resonates are occurred, and the obtained data are written into the controller 10 for analysis and processing.

The controller 10 compares the monitoring data of the triaxial accelerometer, the monitoring data of the downhole environment temperature and a pre-written inherent frequency versus voltage curve when the vibration absorber resonates at different temperatures. A control circuit selects a corresponding voltage value at which the vibration absorber inherent frequency avoids or is far away from the downhole environment vibration frequency at the existing borehole temperature.

When the vibration absorber inherent frequency needs to be adjusted, a relatively stable piece of data where the fluctuation of the downhole environment vibration frequency is <10% is intercepted, and the obtained data is averaged to serve as the current downhole environment vibration frequency, which is set as x.

The current downhole environment vibration frequency x is compared with the current vibration absorber inherent frequency y. If y≤0.6x or if y≥1.4x, the current vibration absorber inherent frequency does not need to be adjusted; if 0.6x<y<x, the vibration absorber inherent frequency is adjusted to Z=1.4x; and if x<y<1.4x, the vibration absorber inherent frequency is adjusted to Z=0.6x.

According to the current downhole temperature, a vibration absorber inherent frequency target value Z is compared with the pre-written inherent frequency versus voltage curve when the vibration absorber resonates at different temperatures to obtain a corresponding voltage value, and a voltage value applied between the vibration absorber shell 15 and the vibration absorber core 3 is adjusted according to the obtained voltage value.

According to the drilling speed temperature rise and the drilling environment changes, it is set to adjust the vibration absorber inherent frequency every 2 hours. If the well conditions are complicated or the drilling speed is high, the adjustment time can be appropriately shortened.

The power module 8 is a multi-output power module, which supplies power to the X axis vibration accelerometer 7, the Y axis vibration accelerometer 13, the Z axis vibration accelerometer 12, the controller 10 and the vibration absorber body 2 respectively.

When the while-drilling instrument is working downhole, an acquisition circuit on the controller 10 acquires vibration monitoring data on the X axis vibration accelerometer 7, the Y axis vibration accelerometer 13 and the Z axis vibration accelerometer 12 and downhole environment temperature monitored on the temperature sensor 14, a processing circuit on the controller 10 processes the acquired data and compares the processed data with the pre-written inherent frequency versus voltage data when the vibration absorber resonates at different temperatures on the controller 10, thereby selecting a corresponding voltage value at which the vibration absorber inherent frequency is capable of avoiding or being far away from the downhole environment vibration frequency at the existing borehole temperature, and the control circuit on the controller 10 controls the power module 8 to apply the acquired voltage value between the vibration absorber shell 16 and the vibration absorber core 3, so that the self-adjusting damping vibration absorber achieves the best vibration damping effect.

The self-adjusting damping vibration absorber for while-drilling instruments and the adjusting method thereof provided by the embodiment of the present application have been described in detail above. The description of the above embodiment is only used to help understand the method and core concept of the present application. At the same time, for those of ordinary skill in the art, according to the concept of the present application, there will be changes in the specific implementation and the scope of application. In summary, the content of this specification should not be construed as a limitation to the present application.

Certain words are used in this specification and claims to refer to specific components. Those skilled in the art should understand that hardware manufacturers may use different terms to refer to the same component. This specification and claims do not use differences in names as a way to distinguish components, but use differences in functions of components as criteria for distinguishment. For example, "include" or "comprise" mentioned in the entire specification and claims is an open-ended term, so it should be interpreted as "include/comprise, but not limited to". "Approximately" means being within an acceptable error range. Those skilled in the art can solve the technical problem within a certain error range, and basically achieve the technical effect. The subsequent description of the specification is a preferred implementation for implementing the present application, but the description is for the purpose of illustrating the general principles of the present application and is not intended to limit the scope of the present application. The protection scope of the present application shall be subject to those defined in the appended claims.

It should also be noted that the term "comprise", "include" or any other variant thereof is intended to cover non-exclusive inclusion, so that a commodity or system that includes a series of elements includes not only those elements, but also other elements that are not explicitly listed, or also includes elements inherent to the commodity or system. In the case where there are no more limitations, the element defined by the sentence "including a . . . " does not exclude the existence of other identical elements in the commodity or system that includes the element.

It should be understood that the term "and/or" used herein is only an association relationship describing associated objects, and indicates that there may be three relationships, for example, A and/or B can indicate: A exists alone, A and B exist at the same time, and B exists alone. In addition, the character "/" herein generally indicates that the associated objects before and after are in an "or" relationship.

The above description shows and describes several preferred embodiments of the present application. However, as mentioned above, it should be understood that the present application is not limited to the form disclosed herein and should not be regarded as an exclusion to other embodiments, but can be used in various other combinations, modifications and environments and can be modified through the above teachings or technology or knowledge in related fields within the scope of the application concept described herein. The modifications and changes made by those skilled in the art without departing from the spirit and scope of the present application should fall within the protection scope of the appended claims of the present application.

What is claimed is:

1. A self-adjusting damping vibration absorber for while-drilling instruments, wherein the self-adjusting damping vibration absorber comprises a vibration monitor and controller tool and a vibration absorber body;

the vibration monitor and controller tool is configured to monitor a vibration frequency of a downhole while-drilling instrument under different working conditions, analyze the vibration frequency and control the vibration absorber body; and the vibration absorber body is configured to absorb vibration energy and accelerate vibration attenuation, and is capable of changing a vibration damping coefficient according to an instruction from the vibration monitor and controller tool;

wherein the vibration monitor and controller tool is mounted inside the downhole while-drilling instrument, one end of the vibration absorber body is connected to the vibration monitor and controller tool, and an other end of the vibration absorber body is connected to a tool that needs vibration damping;

wherein the vibration absorber body comprises a vibration absorber shell, a vibration absorber core, a damping adjustment layer and a scotch;

one end of the vibration absorber shell is connected to a sensor or circuit board tool that needs vibration damping, an inside of an other end of the vibration absorber shell is provided with a damping adjustment cavity, an inside of the damping adjustment cavity is provided with a limit boss, and a side wall close to an end of the damping adjustment cavity is provided with a limit ring groove;

an outer side wall of the vibration absorber core is coated with the damping adjustment layer, one end of the vibration absorber core is inserted into the inside of the damping adjustment cavity, the vibration absorber core inserted into the damping adjustment cavity is provided thereon with a scotch fixing via and a double boss matched with the limit boss, the scotch is inserted into the scotch fixing via, two ends are respectively inserted into the limit ring groove, and the scotch is capable of rotating along the limit ring groove; and an other end of the vibration absorber core is connected to the vibration monitor and controller tool.

2. The self-adjusting damping vibration absorber according to claim 1, wherein the vibration absorber shell comprises a first vibration absorber half shell and a second vibration absorber half shell;

wherein cross sections of the first vibration absorber half shell and the second vibration absorber half shell are semicircular, end surfaces are respectively provided thereon with a boss and a groove, and the boss and the groove are matched with each other to realize mutual limit of the first vibration absorber half shell and the second vibration absorber half shell.

3. The self-adjusting damping vibration absorber according to claim 1, wherein a thickness of the damping adjustment layer is 2-5 mm.

4. The self-adjusting damping vibration absorber according to claim 1, wherein a material of the damping adjustment layer is an electroactive polymer.

5. The self-adjusting damping vibration absorber according to claim 1, wherein the vibration absorber body is connected to the vibration monitor and controller tool with an insulating pad in a middle, and the insulating pad is fastened with the vibration monitor and controller tool through insulating connectors; and a material of the insulating pad and the insulating connectors is a high-strength polyetheretherketone (PEEK) material.

6. A self-adjusting damping vibration absorber for while-drilling instruments, wherein the self-adjusting damping vibration absorber comprises a vibration monitor and controller tool and a vibration absorber body;

the vibration monitor and controller tool is configured to monitor a vibration frequency of a downhole while-drilling instrument under different working conditions, analyze the vibration frequency and control the vibration absorber body; and the vibration absorber body is configured to absorb vibration energy and accelerate vibration attenuation, and is capable of changing a vibration damping coefficient according to an instruction from the vibration monitor and controller tool;

wherein the vibration monitor and controller tool is mounted inside the downhole while-drilling instrument, one end of the vibration absorber body is connected to the vibration monitor and controller tool, and an other end of the vibration absorber body is connected to a tool that needs vibration damping;

wherein the vibration monitor and controller tool comprises a structure body, a power module, an X axis vibration accelerometer, a Y axis vibration accelerometer, a Z axis vibration accelerometer, a temperature sensor and a controller;

wherein the X axis vibration accelerometer, the Y axis vibration accelerometer, the Z axis vibration accelerometer, the power module, the temperature sensor and the controller are all arranged on the structure body; and the X axis vibration accelerometer, the Y axis vibration accelerometer, the Z axis vibration accelerometer, the power module and the temperature sensor are all connected to the controller, and one end of the structure body is fixedly connected to one end of the vibration absorber core.

7. An adjusting method using a self-adjusting damping vibration absorber for while-drilling instruments, wherein the self-adjusting damping vibration absorber comprises a vibration monitor and controller tool and a vibration absorber body;

the vibration monitor and controller tool is configured to monitor a vibration frequency of a downhole while-drilling instrument under different working conditions, analyze the vibration frequency and control the vibration absorber body; and the vibration absorber body is configured to absorb vibration energy and accelerate vibration attenuation, and is capable of changing a vibration damping coefficient according to an instruction from the vibration monitor and controller tool;

wherein the vibration monitor and controller tool is mounted inside the downhole while-drilling instrument, one end of the vibration absorber body is connected to the vibration monitor and controller tool, and an other end of the vibration absorber body is connected to a tool that needs vibration damping;

wherein the method comprises the following steps:

S1) acquiring the vibration frequency of the downhole while-drilling instrument at different temperatures in real time according to a limit time as a current downhole environment vibration frequency x;

S2) comparing the acquired vibration frequency x of the downhole while-drilling instrument at different temperatures with a vibration absorber inherent vibration frequency y adjusted last time; and S3) determining whether the vibration absorber inherent vibration frequency y needs to be adjusted to avoid resonance according to a comparison result.

8. The adjusting method according to claim 7, wherein criteria for the comparison in S2) are:

if $y \leq 0.6x$ or $y \geq 1.4x$, the vibration absorber inherent vibration frequency y does not need to be adjusted;

if $0.6x < y < x$, the vibration absorber inherent vibration frequency is adjusted to $y = 1.4x$; and if $x < y < 1.4x$, the vibration absorber inherent vibration frequency is adjusted to $y = 0.6x$.

9. The adjusting method according to claim 7, wherein the current downhole environment vibration frequency x in S1) is: a vibration frequency with a fluctuation rate $\leq 10\%$ intercepted among the vibration frequencies of the used downhole while-drilling instrument.

* * * * *